(12) United States Patent
Oratovsky et al.

(10) Patent No.: US 7,650,341 B1
(45) Date of Patent: Jan. 19, 2010

(54) DATA BACKUP/RECOVERY

(75) Inventors: Vitaly M. Oratovsky, Newton, MA (US); Sudhir Srinivasan, Acton, MA (US); Benjamin Levin, Swampscott, MA (US); Kevin J. Shea, Boxborough, MA (US); Shaji O. John, Charlestown, MA (US); Boris Zuckerman, Marblehead, MA (US); Steven A. Orszag, Princeton, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 245 days.

(21) Appl. No.: 11/615,534

(22) Filed: Dec. 22, 2006

Related U.S. Application Data

(60) Provisional application No. 60/753,494, filed on Dec. 23, 2005.

(51) Int. Cl.
G06F 17/30 (2006.01)
(52) U.S. Cl. .......................................... 707/10; 707/200
(58) Field of Classification Search ...................... None
See application file for complete search history.

(56) References Cited

U.S. PATENT DOCUMENTS

| | | | | |
|---|---|---|---|---|
| 6,029,168 A | * | 2/2000 | Frey | 707/10 |
| 6,782,389 B1 | * | 8/2004 | Chrin et al. | 707/10 |
| 2004/0267822 A1 | * | 12/2004 | Curran et al. | 707/200 |

* cited by examiner

*Primary Examiner*—Charles Rones
*Assistant Examiner*—Belix M Ortiz

(57) ABSTRACT

An apparatus in a first device of an association of devices includes a processor configured to: communicate with a storage device storing segments of a distributed, segmented single first file system including file system entities residing in segments and including at least portions of one of files and directories, the association of devices including file servers that control metadata of separate segments of the single first file system, including metadata of file system entities residing in the segments; communicate with a backup module configured to backup file system data of a second file system different from a distributed, segmented file system; analyze data in the single first file system to determine data associated with different segments of the single first file system; and present data from the single first file system to the backup module in accordance with what data belong to which segment of the single first file system.

21 Claims, 6 Drawing Sheets

DATA BACKUP/RECOVERY

CROSS-REFERENCE TO RELATED ACTIONS

This application claims the benefit of U.S. Provisional Application No. 60/753,494 filed Dec. 23, 2005, which is incorporated herein by reference.

BACKGROUND

Backing up or restoring large file systems in a limited amount of time is an increasingly critical problem for enterprises. Typically, backup/restore plays a critical role in at least two fundamentally different real-world scenarios, disaster recovery and recovery of a few select files (small-scale recovery).

Disaster recovery involves large amounts of data to be restored. Disaster recovery may be necessitated by a hardware failure of the storage subsystem. For example, one or more disks or storage partitions may be lost to an extent that RAID (disk redundancy) protection and file system checks (fsck or chkdsk) are unable to remedy the situation. Alternatively, the problem could be caused by operator error (e.g. an operator may accidentally overwrite a volume). The entire file system can be restored to a storage device that has enough capacity to accommodate the entire file system. This storage device could be smaller than the original (damaged) raw device if the file system was less than full. More likely, the new storage device would be the same size, or larger, than the one on which failure occurred. The file system may be taken off-line while the restore is in progress, or it may be partially available.

Select-file recovery typically involves a small amount of data to be restored. Typically, this recovery is used to recover data after a user realizes that the user unintentionally deleted or modified a file. Often, the user wants to retrieve an older copy of the file from backup, but keep the current copy of the file too. It is desired to place the restored file either in the original file system, or another file system. This process typically involves interactively browsing various backup sets to determine of the file is found. Select-file recovery may also be used for partial loss due to file system damage. For example, a customer could experience a power outage or a server crash. The system administrator can run a tool like fsck, which will bring the file system to a consistent state, but a few files may be lost. The system administrator may then attempt to recover only the lost/damaged files from backup while the rest of the file system is declared to be healthy and returned to active service.

With Unix, there have been several traditional backup/restore methods including (i) tar; (ii) cpio; (iii) dump/restore. Tar and cpio operate on mounted file systems, whereas dump operates on raw devices. Dump understands the file system on-disk structures, and creates a backup stream that contains information about inodes, as well as directory entries (d-entries), and data blocks in use. In Unix® and Linux®, an inode (index node) describes a file (which itself may be a directory). A file can have several names (or no name at all), but it has a unique inode. A d-entry describes a name of a file including the inode of the file in the directory plus the pathname used to find the file.

Restore operates on mounted file systems and does not preserve inode numbers. Restore has an interactive mode, which is a shell-like interface that allows traversing the dumped namespace to mark which directories/files should be restored. Restore can restore to the same file system, or some other file system, and can overwrite existing files, or can be directed to put the restored files into a different directory.

Essentially two kinds of backup/restore strategies have been used, a name-space walk through a mounted file system, and dump and restore. Name-space walk is exemplified in legacy systems by single-threaded tar and cpio commands, which is file system indifferent. Tar and cpio generate their own inverses that can be used for restores. When a backup is performed using name-space walk, a tree is traversed from root to directory to file across all possible branches. Such a name-space walk does not preserve inode numbers or d-entries; but does preserve the names of directories and files. Thus, a restore of a namespace-based backup can write to a new file system.

On the other hand, dump and restore commands perform walks across the file system based on inodes, not names. Dump and restore can work on raw disks and are file system specific. In this case, the restore process takes a pass to discover what is to be restored on the basis of inode information that may involve examination of time stamps indicating changes, modifications, access, etc. and another pass to fix and restore the data. When this is accomplished, the restore re-creates the file system components.

The magnitude of data storage is increasing, and bringing with it associated issues. While data storage is on the rise, it is desirable to keep backup times low. Today, it would take about 72 hours to backup a 10 TB file system, assuming a single tape device data streamed at 40 MBytes/sec. This backup window is likely to be unacceptably long, especially given that full level-0 backups are often performed about once every two weeks (e.g., because typically 40-50% of a file system's contents have changed after two weeks). Further, a typical tape can now store only about 80 GBytes of data (though 200 GByte cartridges will soon become available), which means that it could easily take several tapes just to back up a small portion of an enterprise's data. A full level-0 backup of a 10 TB file system would use at least 128 tapes, whereas a typical daily backup of the same file system would use about 12 tapes.

SUMMARY

In general, in an aspect, the invention provides an apparatus disposed in a first device of an association of devices and including: a memory that stores computer-readable, computer-executable instructions; and a processor coupled to the memory and configured to read and execute the instructions to: communicate with a storage device storing segments of a distributed, segmented single first file system including file system entities residing in segments and including at least portions of one of files and directories, the association of devices including file servers that control metadata of separate segments of the single first file system, including metadata of file system entities residing in the segments; communicate with a backup module configured to backup file system data of a second file system different from a distributed, segmented file system; analyze data in the single first file system to determine data associated with different segments of the single first file system; and present data from the single first file system to the backup module in accordance with what data belong to which segment of the single first file system.

Implementations of the invention may include one or more of the following features. The processor is configured to present the data from the single first file system to the backup module in parallel streams with each stream containing data from a single segment only of the single first file system. The processor is configured to present the data from the single first file system to the backup module in accordance with a filtered namespace. The filtered namespace is configured to indicate to the backup module only portions of a complete namespace of the single first file system that are controlled by the first device.

In general, in another aspect, the invention provides an apparatus disposed in a first device of an association of devices and including: a memory that stores computer-readable, computer-executable instructions; and a processor coupled to the memory and configured to read and execute the instructions to: communicate with a first storage device storing segments of a distributed, segmented single file system including file system entities residing in segments and including at least portions of one of files and directories, the association of devices including file servers that control metadata of separate segments of the single file system, including metadata of file system entities residing in the segments; analyze data in the single file system to determine data associated with different segments of the single file system; and send data from the first storage device toward a second storage device in accordance with the segments in which the data reside.

Implementations of the invention may include one or more of the following features. The processor is configured to send data from the first storage device toward the second storage device in different streams with each stream containing data residing in a single segment of the single file system. The processor is configured to send data from the first storage device toward the second storage device in the different streams in parallel. The processor is further configured to: analyze data in the second storage device to determine data associated with different segments of the single file system; and send data from the second storage device toward the first storage device in accordance with the segments in which the data reside. The processor is configured to send data from the second storage device toward the first storage device in different streams in parallel, with each stream containing data residing in a single segment of the single file system. The processor is configured to send data from the second storage device toward the first storage device to indicate changes to portions of the data for amending the portions of the data to at least one of earlier versions of the portions and later versions of the portions.

In general, in another aspect, the invention provides an apparatus disposed in a first device of an association of devices and including: a memory that stores computer-readable, computer-executable instructions; and a processor coupled to the memory and configured to read and execute the instructions to: communicate with a first storage device storing segments of a distributed, segmented single file system including file system entities residing in segments and including at least portions of one of files and directories, the association of devices including file servers that control metadata of separate segments of the single file system, including metadata of file system entities residing in the segments; communicate with a second, backup storage device configured to store backup data of the single file system; analyze data in the first and second storage devices to determine data associated with different segments of the single first file system; and transfer file system data between the first and second storage devices in parallel data streams that each contain file system entities corresponding to a single segment of the single file system.

Implementations of the invention may include one or more of the following features. The processor is configured to transfer shadow root information for different segments between the first and second storage devices in association with the file system entities associated with the shadow root information.

In general, in another aspect, the invention provides an apparatus disposed in a first device of an association of devices and including: a memory that stores computer-readable, computer-executable instructions; and a processor coupled to the memory and configured to read and execute the instructions to: communicate with a first storage device storing segments of a distributed, segmented single file system including file system entities residing in segments and including at least portions of one of files and directories, the association of devices including file servers that control metadata of separate segments of the single file system, including metadata of file system entities residing in the segments; communicate with a second, backup storage device configured to store backup data of the single file system; analyze data in the first and second storage devices to determine data associated with different segments of the single first file system; transfer file system data from the second storage device to the first storage device to restore at least a portion of a particular segment; analyze directory entries in at least the portion of the particular segment and analyze data in the first storage device to identify directory entries in at least the portion of the particular segment that point to Inodes that currently reside in corresponding new locations, different than the locations indicated by the identified directory entries; and modify the identified directory entries to point to the corresponding new locations.

In general, in another aspect, the invention provides an apparatus disposed in a first device of an association of devices and including: a memory that stores computer-readable, computer-executable instructions; and a processor coupled to the memory and configured to read and execute the instructions to: communicate with a first storage device storing segments of a distributed, segmented single file system including file system entities residing in segments and including at least portions of one of files and directories, the association of devices including file servers that control metadata of separate segments of the single file system, including metadata of file system entities residing in the segments; communicate with a second, backup storage device configured to store backup data of the single file system; analyze data in the first and second storage devices to determine data associated with different segments of the single first file system; transfer file system data from the second storage device to the first storage device to restore at least a portion of a particular segment; analyze directory entries in at least the portion of the particular segment and analyze data in the first storage device to identify directory entries in at least the portion of the particular segment that point to Inodes that currently reside in a segment other than the particular segment; and compare generation indicators of the identified directory entries and the Inodes pointed to by the identified directories.

Implementations of the invention may include one or more of the following features. The processor is configured to provide an indication to restore earlier states of at least some of the segments of the single file system if the generation indicator of a particular identified directory is different than the generation indicator of a particular Inode to which the particular directory entry points. The processor is configured to provide a prompt, if the generation indicator of a particular identified directory is different than the generation indicator of a particular Inode to which the particular directory entry points, for a selection to retain a current file system entity associated with the particular Inode or a previous file system entity associated with the particular Inode.

In accordance with implementations of the invention, one or more of the following capabilities may be provided. Data backup and restore times can be reduced. Logistics for backing up data to tape drives can be reduced. Self-consistency of the full file system when only parts of the file system are restored can be assured. Time to restore segments of data can be reduced. File system coherency can be maintained during data (e.g., whole segment) restoration. Efficiency can be increased, and restore time decreased, for restoring segments of a file system to a consistent state. The backup/restore needs of distributed, clustered computing systems can be effectively met. Throughput to meet the limited number of hours in a typical enterprise's backup window can be provided. Logistics of retrieving data from tape for a data restore can be reduced.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide techniques for backing up and restoring data using a distributed, segmented file system. Data from segments can be stored, restored, or rolled back to a previous state. Further, standard backup software not designed for use with distributed, segmented file systems can be adapted for use with a distributed, segmented file system.

Figure 1:
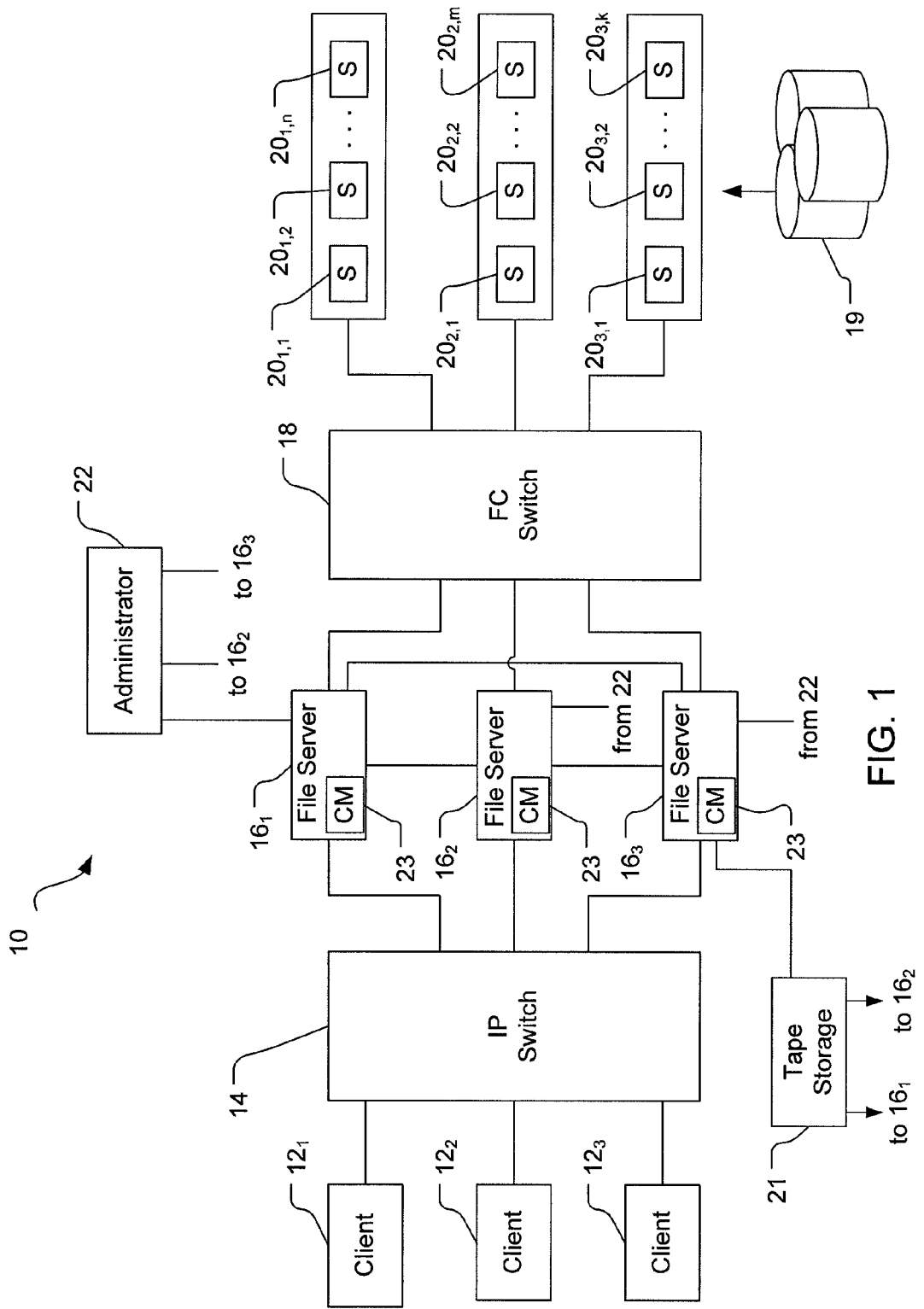
FIG. 1 is a block diagram of a distributed file system.
Figure 5:
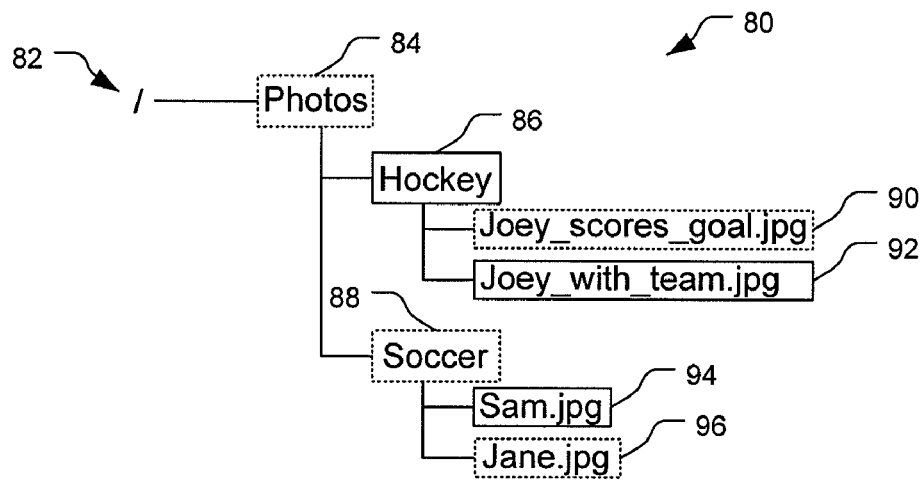
FIG. 5 is a schematic diagram of a complete namespace.

Referring to FIG. 1, a data storage and access system 10 comprises clients $12_1$-$12_3$, an IP switch 14, file servers $16_1$-$16_3$, a fiber channel (FC) switch 18, storage 19, backup storage 21, here tape storage, and an administrator 22. Although three clients 12 and three file servers 16 are shown, other numbers of these devices/systems may be used, and the quantities of the items need not be the same. Further, while only one IP switch 14 is shown, more than one IP switch may be used. The tape storage 21 includes multiple magnetic tapes and is configured and used to store backups of the data in the storage 19. The storage 19 can be any of a variety of physical media, such as disks, and provides a virtualized file system. As indicated in FIG. 5, the storage 19 stores segments $20_{m,n}$ that are portions of a file system and that may be stored anywhere physically on the storage 19, but whose data are logically grouped into the segments 20. The segments 20 are contiguous ranges of disk (or other storage medium) memory with predetermined maximum sizes (e.g., 64 gigabytes ("GB") in one exemplary embodiment). Segments are typically incomplete portions of the file system in that they may refer to file system entities in other segments. For example, a directory/folder of files in the segment $20_{1,3}$ can refer to other segments 20, e.g., the segment $20_{2,1}$ and/or the segment $20_{3,2}$ with addresses in these other segments $20_{2,1}$, $20_{3,2}$ where the corresponding files are stored. A group of the segments 20 is associated with, and controlled by, a corresponding one of the servers 16. For example, the segments $20_{1,x}$ are associated with and controlled by the server $16_1$, etc. The servers 16 control the segments 20 in that the servers 16 arbitrate access to the segments 20, in particular modifying metadata including allocating file system blocks, modifying directories, etc. The file servers 16 can be any device or portion of a device that controls segment access. The clients 12 and the IP switch 14, the IP switch 14 and the file servers 16, the file servers 16 and the FC switch 18, and the FC switch 18 and the storage 19 are configured and coupled for bi-directional communication. Transmission apparatus other than the FC switch 18 would be acceptable, such as an iSCSI device or any of numerous high-speed interconnects available now or in the future. The file servers 16 may also be directly connected to the segments 20. Further, the file servers 16 are configured and coupled for bi-directional communication with each other and with the administrator 22.

The system 10 implements a distributed, segmented single file system. Segmented file systems are discussed in U.S. Pat. No. 6,782,389. A segment in a Linux/Unix operating system is a collection of Inodes that does not necessarily have an organized tree structure itself, hence, a segment need not be a file system itself, nor does more than one segment in such a segmented file system need to be a root Inode. A segmented file system may be non-hierarchical and allow efficient storage of unstructured data. For example, folders and various files contained in the folders may lie on distinct and different segments. The system 10 provides a distributed file system in that the segments 20 of the file system may be dispersed across the storage 19 such that it is not required that the file system be controlled by one server 16 and allows for multiple servers 16 to simultaneously control portions of the file system.

Any of the file servers 16 may be general computing devices, such as personal computers, workstations, etc. As such, the file servers 16 can include processors and memories that store software instructions that are executable by the processors for performing described functions. The file servers 16 may have their own local storage instead of or in addition to the storage 19 and can control/manage segments of a file system on their local storage. The file servers 16 may be clustered to work on a common issue and the clustered servers 16 may be managed/regulated in accordance with the invention.

The file servers 16 can assign FIDs and allocate memory for write requests to the segments 20 that the servers 16 control. Each of the servers 16 can pre-allocate an amount of memory for an incoming write request. The amount of pre-allocated memory can be adjusted and is preferably a fixed parameter that is allocated without regard, or even knowledge, of a quantity of data (e.g., a size of a file) to be written. If the pre-allocated memory is used up and more is desired, then the server 16 can pre-allocate another portion of memory. The server 16 that controls the segment 20 to be written to will allocate an FID (e.g., an Inode number). The controlling server 16 can supply/assign the Inode number and the Inode, complete with storage block addresses. If not all of the pre-allocated block addresses are used by the write, then the writing server 16 will notify the controlling server 16 of the unused blocks, and the controlling server 16 can de-allocate the unused blocks and reuse them for future write operations.

The file servers 16 are also configured to produce and store redundant paths to files and directories. The servers 16 are configured to produce shadow trees indicative of file or subdirectory ancestry where a file system object, e.g., a file or a subdirectory, is an orphan in that the parent directory of the file system object is located in a segment 20 other than the segment 20 containing the file system object. Shadow trees are preferably produced where a parent directory is located in a different segment 20 because control of the segments 20 may be migrated from one server 16 to another, although shadow trees may be produced only where the parent directory is in a segment 20 controlled by a different server 16. Each file server 16 can determine, e.g., in response to a write request, that an orphan (file system object) is, has been, or will be produced in a segment 20 different from the segment 20 in which its parent directory resides. Each file server 16 can determine and store an ancestry associated with the orphan.

The file servers 16 can determine, produce and store shadow tree ancestries for orphans in a variety of manners. The servers 16 can determine information (including identifiers) about the ancestry of an orphan from a create lookup and store the ancestry. For example, if a write request includes the entire prefix for the orphan, e.g., as in Windows® systems, then the file servers 16 can elicit the prefix from the request and store the prefix. Alternatively, for Unix® systems, a write request does not include the entire prefix, but data exist in the memory of the file servers 16 that the file servers 16 can use to reconstruct the prefix.

The backup techniques of the invention can exploit the data-path parallelism of the system's 10 multiple servers 16 and multiple segments 20. The parallelism can be exploited to reduce the time used to back up data in the segments 20.

Figure 2:
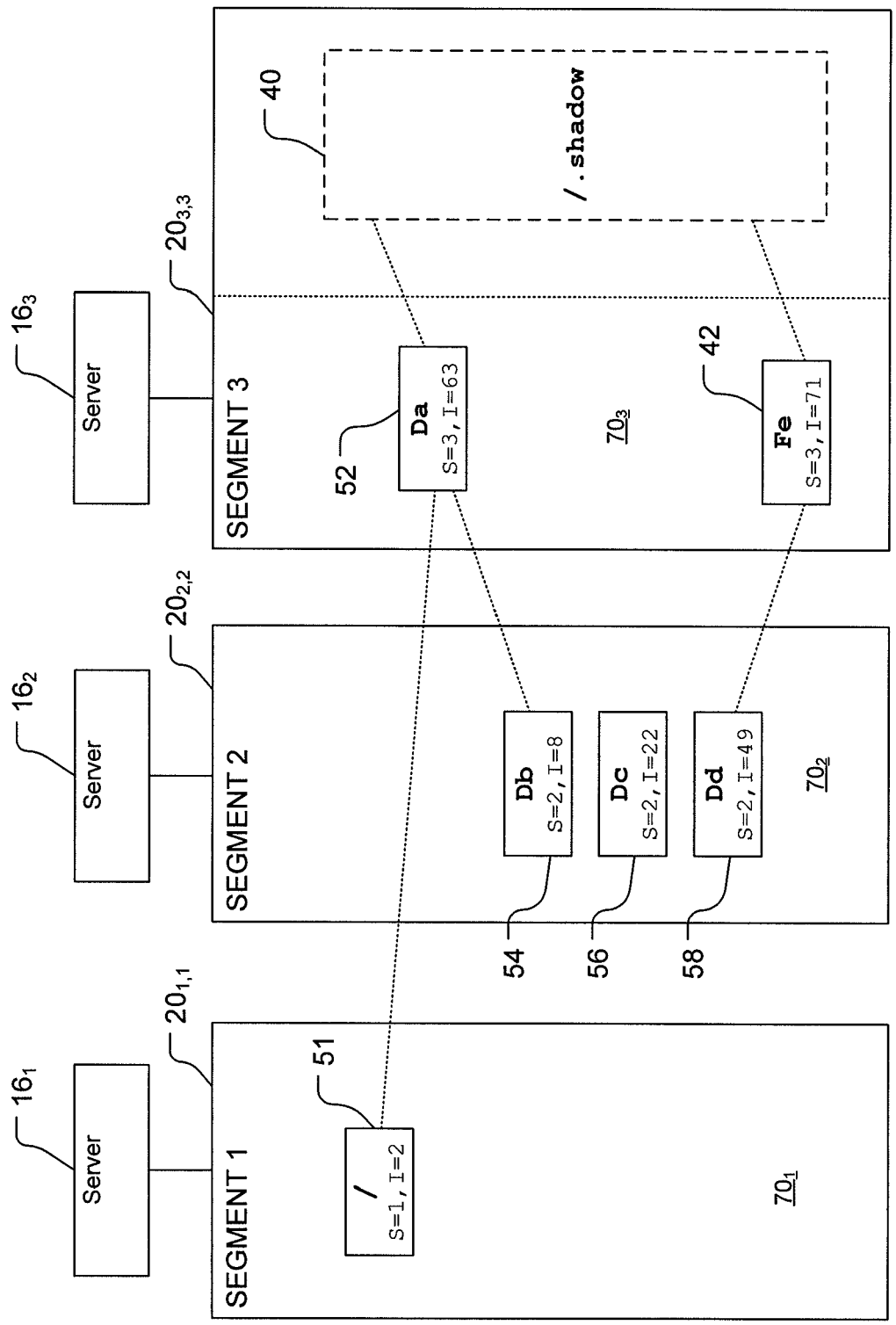
FIG. 2 is a block diagram of three servers and corresponding distributed file system segments showing a shadow tree of one of the segments.

Referring also to FIG. 2 a shadow 40 for a parent directory of a file 42 is shown for a Unix®-based system as derived from a set of D_entries associated with directories 52, 54, 56, 58. The shadow 40 is derived by the server 16$_3$ and is stored in the segment 20$_{3,1}$. For illustrative purposes, the segments 20 involved in this example are segments 20$_1$-20$_3$ and are controlled by the file servers 16$_1$-16$_3$ respectively. Objects (files or directories) stored in the segments 20 are in primary name spaces 70$_1$-70$_3$ of the segments 20$_1$-20$_3$ while shadow entries are in shadow trees (e.g., the shadow tree 40 of the segment 20$_{3,1}$). The primary name spaces are logically (and possibly, though not necessarily, physically) separate from the shadow trees. Indeed, the shadow entries can be implemented in primary name spaces and artificially hidden. The shadow tree 40 is a logical entity and can be physically implemented in a variety of ways such as by a file system directory tree, a database, a flat text file with a record for each shadow entry, etc. Also, the term "tree" does not require that the tree 40 be of a particular logical form, e.g., a multi-branched entity stemming from a single trunk. For example, the tree 40 could be a single chain of related shadow entries. The D_entries each indicate a directory name, a parent directory Inode number (if applicable), and a self Inode number for each directory or subdirectory 52, 54, 56, 58 in the prefix chain of the write indicating to where the file 42 is to be written. A more detailed description of shadow roots can be found in U.S. patent application Ser. No. 10/833,924, which is incorporated herein by reference.

An Inode may have essentially the same properties as that of a traditional file system Inode. A number uniquely identifies the Inode, which in an exemplary embodiment is a 64-bit quantity. The Inode may contain key information about a file or directory such as type, length, access and modification times, location on disk, owner, permissions, link-count, etc. The Inode may also contain additional information specific to the particular file system.

In the storage 19, Inodes may be maintained in Inode blocks (or groups). The Inode blocks themselves may be quite simple, e.g., including a bitmap showing which Inodes in the block are free, a count of free Inodes, and an array of Inodes themselves, as many as fit in the block.

Each segment 20 of the file system is responsible for a fixed set of Inode numbers. This principle is repeated within the segment 20, that is, the segments 20 may be of varying size, and are made up of a multiple of a smallest file system unit, namely a sub-segment. Within the segment 20, each sub-segment is responsible for a fixed subset of the Inodes in the segment 20.

Backup/Restore Mechanisms for Distributed File Systems

Figure 3:
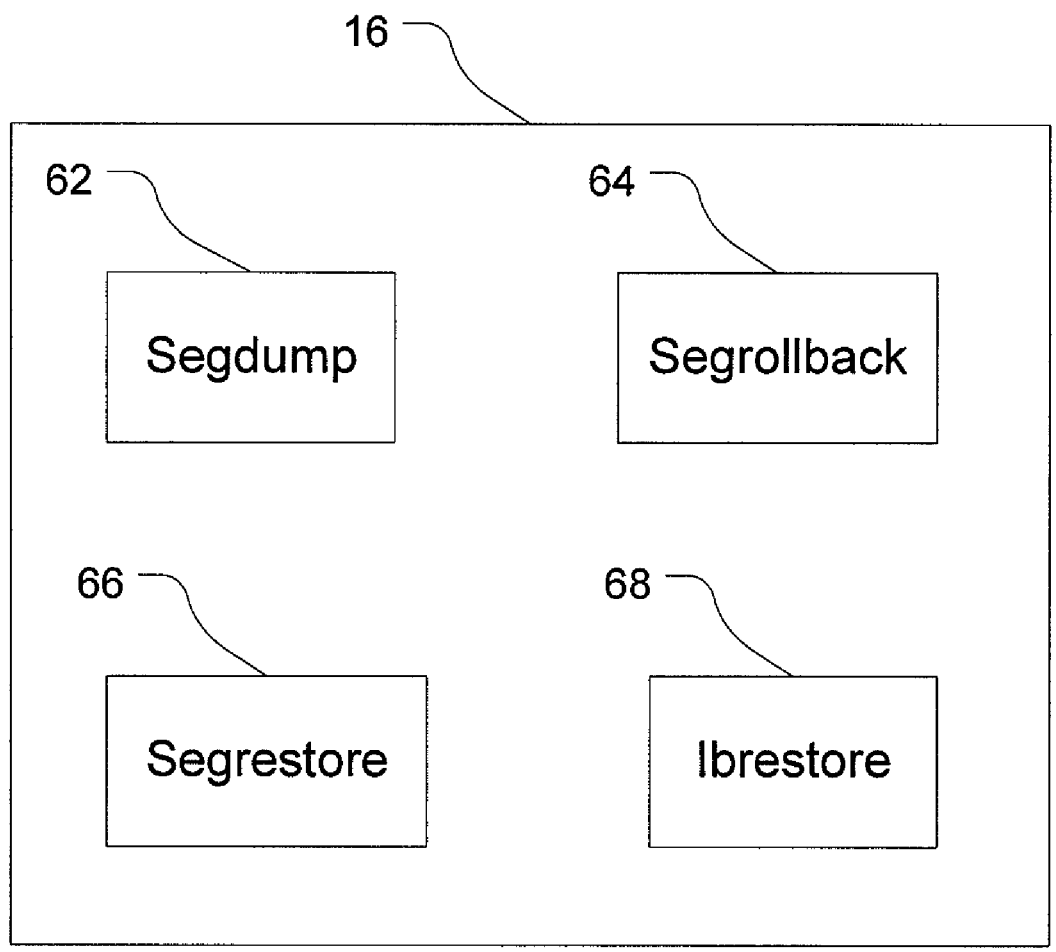
FIG. 3 is a block diagram of backup and restore modules of a server shown in FIG. 1.

Referring to FIGS. 1 and 3, the server 16 includes a segdump module 62, a segrestore module 64, a segrollback module 66, and an ibrestore module 68. The modules 62, 64, 66, 68 are configured to coordinate with the servers 16 to implement various forms of data backup and restoration. The segdump module 62 is configured to implement a whole-segment backup. The segrestore module 64 is configured to implement a whole-segment restoration. The segrollback module 66 is configured to implement a whole-segment rollback. The ibrestore module 68 is configured to implement an individual file/directory restoration. The modules 62, 64, 66, 68 comprise software instructions that can be read and executed by a computer processor to perform functions described herein.

The segdump module 62 is configured to produce a backup stream that will preserve Inode information, as well as D_entries and data blocks, including shadow root structures. The segdump module 62 preferably adheres to traditional dump software semantics. The module 62 is configured to perform incremental dumps, operate on segments 20 in parallel, dump data from the segments 20 to the tape drives 21 that may be locally-attached tape device(s) or remote tape device(s), or to disk, or to other drives, and to operate on a raw volume/partition of a segment 20 (e.g., an unmounted file system). The servers 16 preferably allow the file system to remain mounted while the segment's 20 buffers are flushed to the storage 19, and to keep the segments 20 from changing while the backup is in progress. Several well-known mechanisms e.g. block-level snapshots, exist to accomplish this stability. The segdump module 62 can be used to dump out contents of a damaged segment 20 before running fsck on that segment 20. In this way, raw damaged contents can be saved before the fsck operation may modify or delete them.

Each segment's 20 data dump represents a portion of the global namespace of the file system. If data dumps from all the segments 20 are merged together (minus their shadow structures, discussed below), then the result would represent a complete data dump of the whole file system. Individual segment data dumps can be mated with each other using global Inode numbers and Inode generations (discussed below). For example, a D_entry on one segment 20$_{1,1}$ can refer to a file on another segment 20$_{3,14}$ by means of a global Inode number and generation number stored by the server 16$_1$ (for the example of the segment 20$_{1,1}$) in the D_entry. The generation number can be used during restoration to determine whether there is a correct generation of the inode available in the backup set, or that a correct Inode is absent.

The segrestore module 64 is configured to address disaster recovery by operating on a raw segment device of the storage 19 to restore whole segments 20. The segrestore module 64 is configured to start with a pristine segment 20, and to perform a full ('level 0') restore on the raw device, followed by chronologically younger incremental restores on the device. The full restore and incremental restore data are extracted from the tape drives 21, or other backup media, and written to the desired segment 20. The module 64 (or an operator) preferably makes a target segment 20 into which the restored data will be written pristine by reformatting the segment 20. The segrestore module 64 is configured to restore data by manipulating low-level disk data structures while preserving Inode numbers to reduce or avoid restitching references to/from other segments 20. The module 64 is configured to implement a make-file-system (mkfs) command (mkibfs for the Ibrix segmented file system), that will create a sufficient number of Inodes to accommodate the amount of files backed up. The target segment device of the segrestore module 64 can be of a different size (even smaller) than the original backed-up segment 20, as the restored information may be less than originally stored, and/or the device storing the original information may not have been full. The module 64 is configured to cause the servers 16 to perform segment restores on multiple (e.g., all) segments 20 in parallel (concurrently).

Once a damaged segment 20 has been restored by the segrestore module 64, the damaged segment 20 is likely to be inconsistent with the other segments 20 (because the restored segment 20 may be older than the other segments 20). For example, if fsck is run at this point, fsck will likely find mismatched cross-references and attempt to fix them. Typically this will result in some number of files and directories on the segments 20 being moved to lost+found. In fact, four kinds of inconsistencies may result: broken outbound cross-references, broken inbound cross-references, distributed files, and hidden dependencies.

A broken outbound cross-reference ("outbound" from the damaged segment's point of view) arises if a directory resides on a damaged segment 20 and points at one or more Inodes (e.g., files) that reside on healthy segments 20. If a particular directory is newer than the latest available backup, then when the segrestore module 64 restores the damaged segment 20, the particular directory will not exist in the restored segment 20. Files inside that directory, however, may still exist on healthy segments (but are now dangling with no parent D_entry pointing to these files).

A broken inbound cross-reference ("inbound" from the damaged segment's point of view) arises if a directory resides on a healthy segment but points at one or more Inodes (e.g., files) that reside on the damaged segment 20. If the Inodes were created after the latest available backup, then after a segrestore those Inodes do not exist in the restored segment 20. It is possible after a segrestore that these inodes may be "in use" but represent an entirely different entity (with a newer IGEN number as explained below). The newer D_entry on a healthy segment is now pointing undesirably, e.g., at an unintended file. The segrestore module 64 is configured to remove references to such Inodes from the healthy segment's directory.

A distributed file inconsistency arises from a restored portion of a file not existing or differing from the state of that file portion at the time of segment corruption. If a portion of a distributed file resides on a damaged segment 20, and this portion was created or changed or deleted after the latest available backup was made, then after a segrestore the distributed file can be corrupt either because the actual data of this file portion is older than the rest of the file, or because the Inode chain is broken.

A hidden dependency inconsistency arises where a file on a healthy segment 20 has an implied dependency on a file on a damaged segment 20. For example, a C source code file on a healthy segment 20 might include a '.h' file on a damaged segment.

To help avoid these inconsistencies, the segrestore module 64 is configured to perform operations (via the servers 16) on healthy segments 20. For example, the module 64 can automatically (or suggest to an operator to) bring damaged and healthy segments 20 back to the same backup level. The healthy and damaged segments 20 can be wiped clean by reformatting the segments 20 a complete segrestore performed on each of the segments 20. Alternatively, a rollback utility (as discussed below) could be performed to ensure consistent states of the segments 20.

The whole-segment rollback module 66 is configured to return a healthy segment 20 to an early state. Whole-segment rollback addresses disaster recovery but the module 66 is configured to perform rollbacks on healthy segments 20. For example, if one out of four segments 20 has a hard disk failure, then the bad segment 20 can be segrestored using the segrestore module 64, while the other three segments 20 can be rolled back to a state so that all four segments 20 are consistent with common (e.g., the latest available) backup. The rollback module 66 is configured to roll back segments 20 in parallel to a desired state. The rollback module 66 is configured to apply a desired (e.g., the latest (e.g., daily)) backup to an existing segment 20 to roll back those file system entities that changed since that backup. The module 66 analyzes the deltas indicated by successively earlier in time backups and reverses the indicated deltas to undo the changes from the previous version to the later version to return the file system entities on the segment 20 to the previous version. The module 66 is configured to repeat this for older backups in reverse chronological order up to the full (level 0) backup to restore the file system entities to a desired previous state. Chronologically, this sequence is the reverse of segrestore.

The module 66 is further configured to copy "latest" data on the healthy segments 20 before rolling back the segments 20. The latest data can be made available to a user to show what was changed in file system entities in undamaged segments 20 between the state to which the file system entities were rolled back and the state before roll back. The rollback module 66 is configured to copy the latest data by performing an incremental segdump on the healthy segments 20 to be rolled back from a time corresponding to the roll back state to the present. The data can be presented in a namespace that resembles the mounted file system namespace.

The ibrestore module 68 is configured to coordinate backup streams (each stream being the segdump of a segment) from the segments 20 to provide for individual file system entity restoration. Individual file system entity restore addresses situations where one or a few select entities are to be restored, e.g., after a user accidentally deletes a file. The ibrestore module 68 is configured to implement a filter that coalesces backup streams from (possibly all) segments 20 into a single backup namespace. This filter also hides shadow structures used by the segmented file system to help ensure high availability. The ibrestore module 68 preferably allows interactive navigation of directory trees in backup sets (e.g., backup tapes). The ibrestore module 68 is configured to restore the file system to a mounted file system (e.g., vfs type) by invoking standard POSIX (portable operating system interface) input/output functions.

Backup/Restore Interfacing with Off-The-Shelf Backup Software

Figure 4:
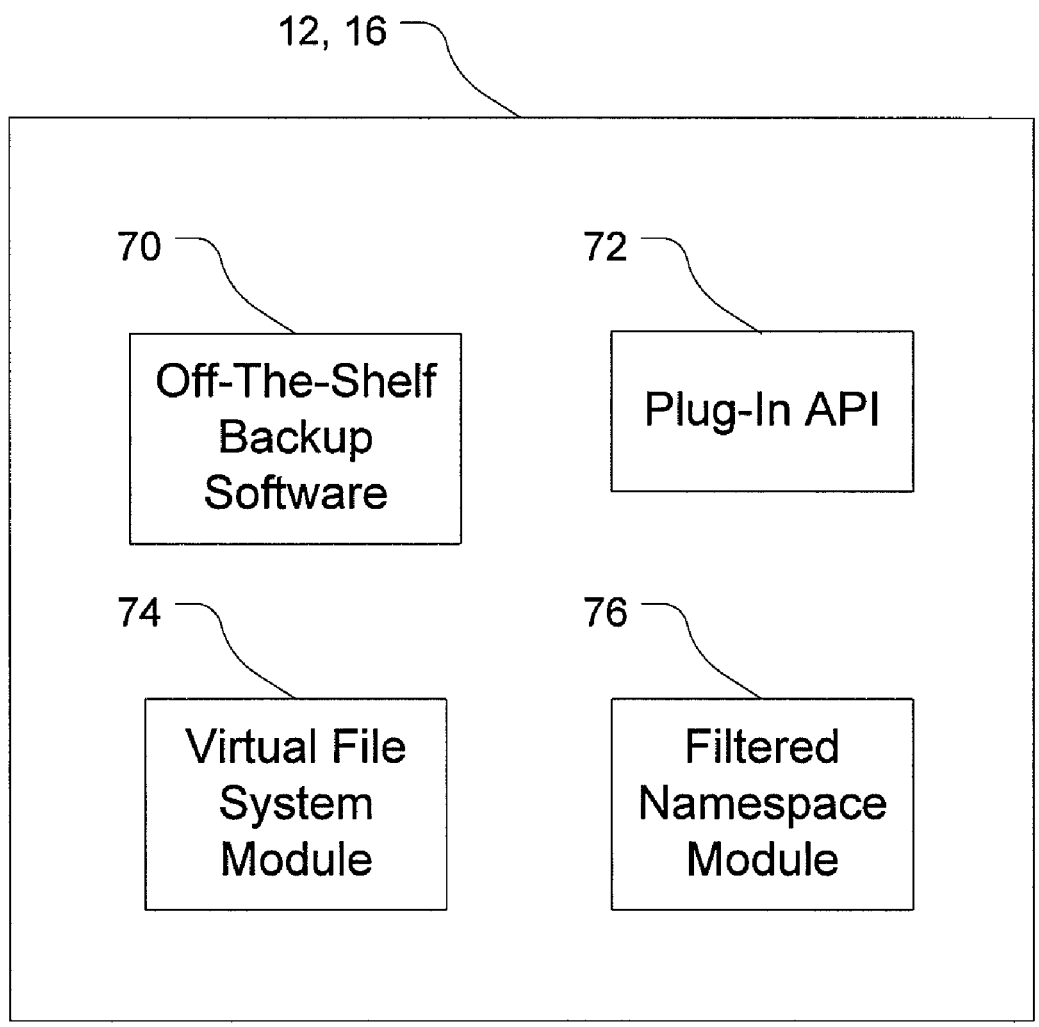
FIG. 4 is a block diagram of backup software and modules in nodes of the system shown in FIG. 1 for interacting with the backup software.

Referring to FIGS. 1 and 4, the clients and/or the servers 16 are configured to interface the segmented dump/restore approach with off-the-shelf backup software 70 to allow the software 70 to be used in the segmented file system environment of the system 10. The software 70 is configured to walk (traverse) a file system namespace to obtain and back up the file system data, but is not configured to do so for a distributed, segmented file system. The software 70 can reside on the clients 12 and/or the servers 16, which are both nodes in the system 10. Thus, the description below discusses nodes 12, 16 interfacing with the software 70, although possibly only the clients 12 or the servers 16 include the software 70. To interface with the software 70, the nodes 12, 16 can merge dumps together and present the merged stream to the software 70. Preferably, the nodes 12, 16 are configured to provide multiple concurrent streams to the software 70, which could be enhanced to handle multiple backup streams where each stream is aligned with a segment 20. Furthermore, the nodes 12, 16 can implement the multiple backup streams on multiple servers 16 concurrently. For example, according to EMC® Corporation of Hopkinton, Mass., its Legato® Net-Worker® software can run concurrent streams while backing up a single file system, and do so on multiple servers. Legato, as well as other software products, creates parallel streams by breaking up the file system namespace. The nodes 12, 16 can be configured to interface with such systems using, e.g., a plug-in application program interface (API) 72, a virtual file system (VFS) provided by a VFS module 74, or a VFS filtered namespace provided by a filtered namespace module 76, as discussed below.

The plug-in API 72 is configured to pipe output of segdump operations into a stream for the off-the-shelf software 70, e.g., Legato. The API 72 is configured to pipe this output through a Linux®/Unix®stdout facility, through a named pipe, through a socket, through shared memory, or another Unix IPC mechanism. The API 72 preferably does not use an intermediate file as the stream is likely to be large.

The VFS module 74 is configured to present a VFS to the software 70 and to translate, during backup/restore, on-disk physical file system structures into parallel dump/restore streams, where each stream represents a single segment. The third-party backup software 70 can operate on a mounted file system. The VFS module 74 is configured to present a virtual file system with a simple namespace structure, e.g.:

/seg1.bak
/seg2.bak
. . .
/segN.bak

Thus, the virtual file system has only one directory with N files where N is the number of segments 20. Alternatively, the VFS could have N directories with one file in each of them. For the one-directory VFS, each segX.bak file is configured such that reading from this file yields a backup stream in "dump" format, which is generated on-the-fly. Likewise, writing a dump stream to segX.bak restores segment X from the dump stream. The VFS module 74 can effect parallel operations, e.g., by instructing Legato's native multi-streaming facilities to back up each segX.bak file as a separate stream. Preferably, the nodes 12, 16 partition the backup job such that a given sub-job executing on a specific machine (e.g., on a specific server 16) is directed to back up that segN.bak which is physically local to that machine. The VFS module 74 thus uses the unmodified off-the-shelf backup software 70 (e.g., Legato) while providing hardware-level parallelism and hardware locality, as well as few if any crossings of the server-to-server network. The VFS module 74 is configured to provide incremental backup and restore, with the module 74 knowing which level of incremental backup/restore is to take place. The module 74 can do so using a number of administrative mechanisms, e.g. Ibrix® Rtool or Unix /proc.

Figure 6:
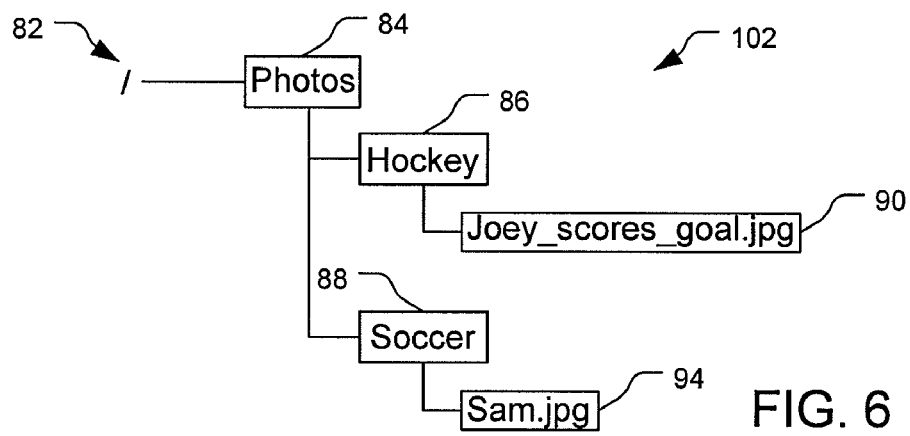
FIGS. 6-7 are schematic diagrams of filtered namespaces of the complete namespace shown in FIG. 5.
Figure 7:
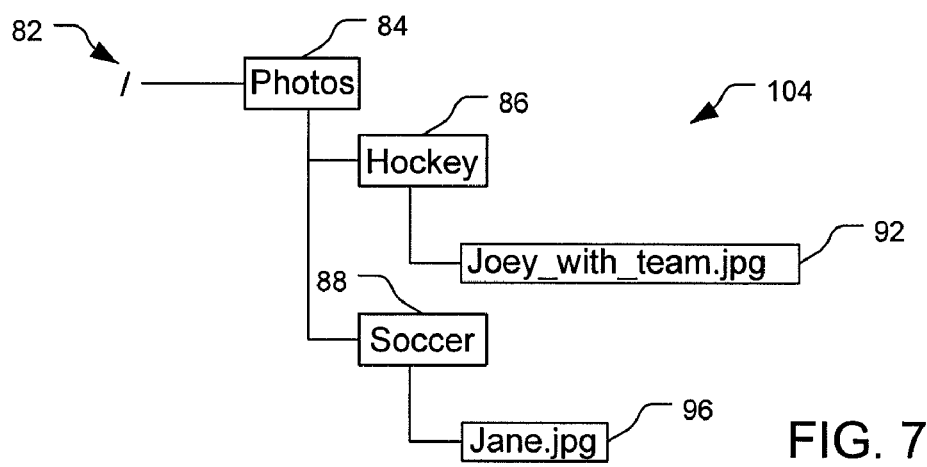

Referring to also FIGS. 5-7, the filtered namespace module 76 is configured to present a traditional view of a mounted file system, i.e., root directory with many levels of sub-directories and files, to the software 70 for the software 70 to perform its backup operations. As shown in FIG. 5, an exemplary complete namespace 80 includes a root directory 82, a photos directory 84, a hockey directory 86, a soccer directory 88, and files 90, 92, 94, 96. For this example, the directories 84, 88 and the files 90, 96 are resident on segment $20_{2,1}$ controlled by the server $16_2$ and the directories 82, 86 and the files 92, 94 are resident on segment $20_{3,4}$ controlled by the server $16_3$. The module 76, presents the content differently to the software 70 in different machines in the file system cluster. The software 70 has access to, and operates on, only the topology that is shown to the software 70. The module 76, instead of presenting the topology to look the same from any node 12, 16, shows a specific subset of the topology to any given node 12, 16. The namespace subset exposed to the software 70 in one node 12, 16 is different from the subset exposed to any other node 12, 16. For example, the module 76 may expose to the software 70 resident in a particular server 16 only those file system entities that are controlled by that particular server 16. In other words, a filtered namespace is a projection function of the complete namespace onto a specific node 12, 16 in the cluster. Thus, continuing with the exemplary namespace 80 shown in FIG. 5, a filtered namespace 102 of the entities on the segment $20_{2,1}$ is shown to the server $16_2$ and a filtered namespace 104 of the entities on the segment $20_{3,4}$ is shown to the server $16_3$. A union of all projections would be the complete namespace.

A projection function based on file locality would result in exposing only those files associated with a particular node 12, 16, and that can thus be processed efficiently. For example, a simple Unix tar command can be used on every node 12, 16 of the cluster in parallel to back up the entire file system starting at its root directory. If this was attempted on a file system without filtered namespaces, it would result in N copies of the entire file system contents (where N is the number of nodes in the cluster), with N−1 copies being redundant, and using a large amount of time to produce. By contrast, the system 10, using filtered namespaces can produce N non-overlapping sets of files, where each set is efficiently (e.g., optimally) produced.

Disaster recovery can be performed very efficiently if the backup was performed with filtered namespaces. Using filtered namespaces, a backup segregates data from different segments 20 onto different portions of the backup tape storage 21. The module 76 can keep track of what is on every tape. Therefore, if a specific segment 20 fails, then the portion of the tape storage 21 that contains that segment's data will not contain data from any other segments 20, and a restore can be performed without scanning other portions of the storage 21, especially tapes in the storage 21 that do not contain any portion of the failed segment 20.

Inter-Dependencies Between Segments

The system 10 is preferably configured to back up all the segments 20 together. Indeed, restoring one or more segments 20 without restoring all other segments 20 may result in an inconsistent file system. Distributed or striped files (in which different pieces of a large file are stored on different segments 20) are an example: if one portion is restored without restoring the remainder of the file, then the restored portion would be older than the rest of the file, and the file in its totality may not look like the backed up version, nor like the "most recent" version just prior to that single segment being restored. Thus, the system 10 preferably is configured to restore entire distributed files where its portions exist.

The system 10 is further configured to preserve Inode numbers or alternatively "restitch" references. D_entries which exist on one segment 20 can point to Inodes on another segment 20. The system 10 is configured to restore data while preserving Inode numbers or adjusting D_entries on segments 20 that point to a relocated restored Inode to point to the new location. Furthermore, the system 10 is configured such that if Inode numbers are not preserved, then shadow structures 40 used for high availability and fast traversal of 'trees' are adjusted as appropriate. Further, Inode numbers are preserved or restitched for portions of distributed files.

Consistency Mechanisms

Figure 8:
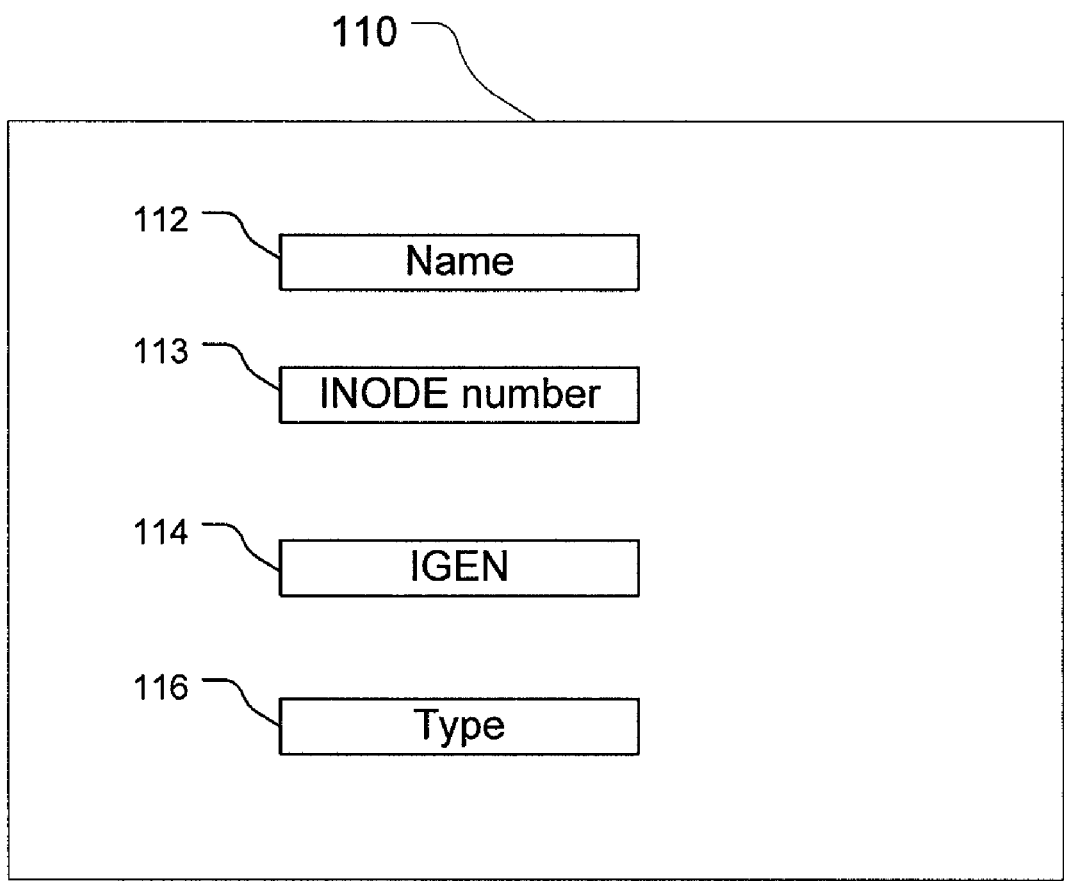
FIG. 8 is a block diagram of a D_entry.

Referring to FIG. 1 the servers 16 each include a consistency module 23 configured to analyze portions of D_entries to help ensure file system consistency. Referring also to FIG. 8, a typical D_entry structure 110 in a segment 20 includes, but is not limited to, a name 112, an INODE number 113, an IGEN number 114, and a type 116.

The name 112 is a string, e.g., "Joey_scores_goal.jpg." The INODE number 113 is, here, a 64-bit Inode number, including information on the segment number as well as the Inode as discussed in U.S. Pat. No. 6,782,389. The IGEN number 114 is a generation number that the server 16 is configured to change when an Inode changes state from being free to being allocated, but not when the Inode is rewritten or updated. The type 116 indicates the type of file system entity to which the D_entry points, e.g., a file, a directory, a symlink, etc.

The IGEN number 114 indicates a semantic purpose of the Inode and the consistency module 23 is configured to analyze the IGEN number 114 to help ensure consistency of the file system as restored. Inodes and directories may exist on separate segments 20 in the segmented file system as the segmented file system is not hierarchical in structure. The shadow root 40 (see FIG. 2) structure is present on the segment 20 on which a specific Inode resides and points back to the Inode's parent directory and can be referenced, for example, if the segment 20 on which the parent D_entry resides loses availability. Thus, as further explained in U.S. patent application Ser. No. 10/833,924, the existence of shadow roots 40 on each segment 20 can be used to at least partially rebuild a directory that resides on a lost segment 20 and leaves dangling ('orphan') Inodes on other good segments 20 without parents. If a segment 20 is destroyed with no back-up, the shadow root 40 can be used to regenerate the directory structure that was destroyed. In a distributed, segmented file system, however, one segment 20 can move ahead or behind another segment 20 (in time) so that a restored segment 20 may have a D_entry that points to an Inode that no longer contains that information that that Inode did at the time of the backup of the restored segment 20. Also, an Inode in a backup may no longer have a corresponding D_entry. The servers 16 are configured to store the IGEN number 114 in both D_entries and Inodes so that (a) a regenerated D_entry refers to a semantically proper target Inode, and (b) the consistency module 23 can detect an existing D_entry that refers to a target Inode that differs in its semantic purpose from the semantic purpose of the Inode at the time the original D_entry+Inode combination was created. The detected inconsistency can be remedied, e.g., by rolling back an appropriate segment 20. The consistency module 23 can use the IGEN component 114 in a given D_entry to check a backup segment 20 when restored to check that the current file system entity, or at least an earlier version of the current file system entity, is what is restored. If the IGEN 114 of the D_entry and its Inode do not match, then the consistency module 23 determines that different file system entities are involved.

Various corrective actions are available in response to an inconsistency detected by the consistency module 23. The module 23 can compare the IGENs 114 in file system entities to those in the D_entries that may be on different segments 20 and those that match are accepted. If, however, there is a mismatch, this can indicate a dangling D_entry, e.g., an Inode in the backup does not have a D_entry (name) in the current file system. In this case, an old file has not been fully killed and is persisting, thereby causing confusion and an inconsistency in the file system. This is a kind of file apoptosis in which a cell (file) has not been fully killed (deleted). In this case, several actions may be taken including: (a) deleting the file; (b) rolling back all segments 20 to an earlier time at which time the file system is consistent, with updates since that earlier time being lost; or (c) giving the inconsistent file a temporary name together with a file from an earlier backup, with the option of keeping either file. The desirability of the choices in this latter situation may be affected by the nature of the files involved. For example, if the lost files include pictures, it may be acceptable/desirable to keep the newest ones and discard older ones. If, however, the files involved are source code trees it would probably be desired, if not necessary, to move back to a 100% consistent condition with new changes ("deltas" in the source code) stored under new names for use by code developers.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, while the description discussed providing a filtered namespace to the backup software 70 for backup purposes, the filtered namespace can be provided to other modules or mechanisms that traverse a namespace (e.g., virus scanners, data mining applications, etc.) and perform other corresponding functions. Also, while the description discussing providing a filtered namespace described filtering criteria based on object locality, other filtering criteria can be provided for other modules or mechanisms that traverse a namespace. While the description discussed backup tape storage 21, other forms of backup storage may be used such as virtual tape libraries, disk technologies, etc.

Further, while the description above refers to "the invention," more than one invention may be disclosed.

What is claimed is:

1. A distributed, segmented single file system comprising:
   a first server that controls metadata of a first segment of the distributed, segmented single file system, the first segment including file system entities comprising at least portions of at least one of files or directories; and
   a second server, communicatively coupled to the first server, that controls metadata of a second segment of the distributed, segmented single file system, the second segment including file system entities comprising at least portions of at least one of files or directories, the second server being distinct from the first server and the second segment being distinct from the first segment;
   the first segment including a first file and the second segment including a first directory pointing to the first file, the first segment including a file identifier of the first file and a second consistency-check identifier associated with the file identifier;

the second segment further including a D_entry including a first consistency-check identifier associated with the file identifier of the first file; and restore and recover modules communicatively coupled to the first and second servers and configured to restore and recover the first directory and to analyze the first consistency-check identifier and the second consistency-check identifier to determine consistency of the restored first directory and the first file.

2. The file system of claim 1 wherein the first consistency-check identifier comprises a generation number.

3. The file system of claim 1 wherein the second server is configured to use the first consistency-check identifier to verify content of the first file while the single file system is active.

4. The file system of claim 3 wherein the restore and recover modules are configured to initiate restoration or recovery, respectively, if a discrepancy is detected between the first consistency-check identifier and the second consistency-check identifier stored in association with the first file.

5. The file system of claim 4 wherein the recover module is configured to replace a file system entity using a backup and the restore module is configured to replace a file system entity with a clone or replace an outdated clone of a file system entity with a current version of the file system entity.

6. A distributed, segmented single file system comprising:
a first server that controls metadata of a first segment of the distributed, segmented single file system, the first segment including file system entities comprising at least portions of at least one of files or directories; and a second server, communicatively coupled to the first server, that controls metadata of a second segment of the distributed, segmented single file system, the second segment including file system entities comprising at least portions of at least one of files or directories, the second server being distinct from the first server and the second segment being distinct from the first segment;

the first server controlling metadata of a first filtered namespace comprising a first portion of a complete namespace of the single file system;

the second server controlling metadata of a second filtered namespace comprising a second portion of the complete namespace of the single file system, the second filtered namespace being distinct from the first filtered namespace;

the file system including a module configured to traverse the first filtered namespace and the second filtered namespace in parallel; and the first and second segments being confined to independent hardware units;

wherein the first filtered namespace is a subset of a complete namespace of the single file system and the file system entities of the first filtered namespace share a common characteristic other than physical locality.

7. The file system of claim 6 further comprising backup, recover, and restore modules configured to backup, recover, and restore file system entities of the single file system from the first and second filtered namespaces in parallel.

8. The file system of claim 6 wherein the first server is configured to use the first filtered namespace to perform at least one of a virus scan, a compression operation, or a de-duplication.

9. A distributed, segmented single file system comprising:
a first server that controls metadata of a first segment of the distributed, segmented single file system, the first segment including file system entities comprising at least portions of at least one of files or directories; and a second server, communicatively coupled to the first server, that controls metadata of a second segment of the distributed, segmented single file system, the second segment including file system entities comprising at least portions of at least one of files or directories, the second server being distinct from the first server and the second segment being distinct from the first segment;

the first server controlling metadata of a first filtered namespace comprising a first portion of a complete namespace of the single file system;

the second server controlling metadata of a second filtered namespace comprising a second portion of the complete namespace of the single file system, the second filtered namespace being distinct from the first filtered namespace;

the first and second servers associating a respective consistency-check identifier with each file system entity;

the first segment including a shadow tree indicative of non-local file system entities residing on at least one segment other than the first segment, each of the non-local file system entities either being pointed to by, or pointing to, a respective file system entity of the first segment;

the file system further comprising restore and recover modules configured to restore and recover portions of the complete namespace, including a file system entity pointing to one of the non-local file system entities, using the shadow tree and the consistency-check identifiers and to analyze the consistency-check identifiers to determine consistency of restored file system entities.

10. The file system of claim 9 wherein the restore module is configured to compare consistency-check identifiers of the shadow tree with consistency-check identifiers stored in associated with the non-local file system entities indicated by the shadow tree.

11. A computer program product residing on a computer-readable medium and comprising computer-readable instructions configured to cause a computer to:
control metadata of a first segment of a distributed, segmented single file system, the first segment including file system entities comprising at least portions of at least one of files or directories;

control metadata of a second segment of the distributed, segmented single file system, the second segment including file system entities comprising at least portions of at least one of files or directories, the second server being distinct from the first server and the second segment being distinct from the first segment;

store a first file in the first segment and a first directory in the second segment, the first directory pointing to the first file;

store a D_entry in the second segment, the D_entry including a first consistency-check identifier associated with the file identifier of the first file;

store the file identifier in the first segment;

store a second consistency-check identifier in the first segment, the second consistency-check identifier being associated with the file identifier;

recover the first directory and to analyze the first consistency-check identifier and the second consistency-check identifier to determine consistency of the recovered first directory and the first file; and restore the first directory and to analyze the first consistency-check identifier and the second consistency-check identifier to determine consistency of the restored first directory and the first file.

12. The computer program product of claim 11 wherein the first consistency-check identifier comprises a generation number.

13. The computer program product of claim 11 further comprising, instructions configured to cause the computer to use the first consistency-check identifier to verify content of the first file while the single file system is active.

14. The computer program product of claim 13 further comprising instructions configured to cause the computer to initiate recovery or restoration if a discrepancy is detected between the first consistency-check identifier and a second consistency-check identifier stored in association with the first file.

15. The computer program product of claim 14 wherein the instructions configured to cause the computer to initiate recovery include instructions configured to cause the computer to replace a file system entity using a backup and the instructions configured to cause the computer to initiate restoration are configured to at least one of replace a file system entity from a clone or replace an outdated clone of a file system entity with a current version of the file system entity.

16. A computer program product residing on a computer-readable medium and comprising computer-readable instructions configured to cause a computer to:
    control metadata of a first segment of a distributed, segmented single file system, the first segment including file system entities comprising at least portions of at least one of files or directories;
    control metadata of a second segment of the distributed, segmented single file system, the second segment including file system entities comprising at least portions of at least one of files or directories, the second server being distinct from the first server and the second segment being distinct from the first segment, the first and second segments being confined to independent hardware units;
    control metadata of a first filtered namespace residing on the first segment and comprising a first portion of a complete namespace of the single file system;
    control metadata of a second filtered namespace residing on the second segment and comprising a second portion of the complete namespace of the single file system, the second filtered namespace being distinct from the first filtered namespace; and
    traverse the first filtered namespace and the second filtered namespace in parallel;
    wherein the first filtered namespace is a subset of a complete namespace of the single file system with the file system entities of the first filtered namespace sharing a common characteristic other than physical locality.

17. The computer program product of claim 16 further comprising instructions configured to cause the computer to backup and restore file system entities of the single file system from the first and second filtered namespaces in parallel.

18. The computer program product of claim 16 wherein the instructions configured to cause the computer to control metadata of the filtered namespaces are configured to cause the computer to control the metadata of the filtered namespaces such that the filtered namespaces are continually present and up to date.

19. The computer program product of claim 18 further comprising instructions configured to cause the computer to use the first filtered namespace to perform at least one of a virus scan, a compression operation, or a de-duplication.

20. A computer program product residing on a computer-readable medium and comprising computer-readable instructions configured to cause a computer to:
    control metadata of a first segment of a distributed, segmented single file system, the first segment including file system entities comprising at least portions of at least one of files or directories;
    control metadata of a second segment of the distributed, segmented single file system, the second segment including file system entities comprising at least portions of at least one of files or directories, the second server being distinct from the first server and the second segment being distinct from the first segment;
    control metadata of a first filtered namespace residing on the first segment and comprising a first portion of a complete namespace of the single file system;
    control metadata of a second filtered namespace residing on the second segment and comprising a second portion of the complete namespace of the single file system, the second filtered namespace being distinct from the first filtered namespace;
    associate a respective consistency-check identifier with each file system entity;
    produce a shadow tree indicative of non-local file system entities residing on at least one segment other than the first segment, each of the non-local file system entities either being pointed to by, or pointing to, a respective file system entity of the first segment;
    restore and recover portions of the complete namespace, including a file system entity pointing to one of the non-local file system entities using the shadow tree and the consistency-check identifiers; and
    analyze the consistency-check identifiers to determine consistency of restored file system entities.

21. The computer program product of claim 20 wherein the instructions configured to cause the computer to restore and recover are configured to cause the computer to compare consistency-check identifiers of the shadow tree with consistency-check identifiers stored in associated with the non-local file system entities indicated by the shadow tree.

* * * * *

UNITED STATES PATENT AND TRADEMARK OFFICE
CERTIFICATE OF CORRECTION

PATENT NO. : 7,650,341 B1 Page 1 of 1
APPLICATION NO. : 11/615534
DATED : January 19, 2010
INVENTOR(S) : Vitaly M. Oratovsky et al.

It is certified that error appears in the above-identified patent and that said Letters Patent is hereby corrected as shown below:

In column 13, line 18, in Description of Preferred Embodiments, after "FIG. 1" insert -- , --, therefor.

In column 13, line 24, in Description of Preferred Embodiments, delete "goaljpg," and insert -- goal.jpg --, therefor.

In column 17, line 9, in Claim 13, delete "comprising," and insert -- comprising --, therefor.

In column 18, line 45, in Claim 20, after "entities" insert -- , --.

Signed and Sealed this

Fourth Day of May, 2010

David J. Kappos
*Director of the United States Patent and Trademark Office*